Oct. 15, 1940.  W. R. BECKER ET AL  2,218,142

ACCORDION SUPPORT

Filed Sept. 6, 1938

INVENTOR.
WALTER R. BECKER
ARTHUR W. LORENZ
BY Christian R. Nielsen
ATTORNEY.

Patented Oct. 15, 1940

2,218,142

UNITED STATES PATENT OFFICE 2,218,142

ACCORDION SUPPORT

Walter R. Becker and Arthur W. Lorenz,
Milwaukee, Wis.

Application September 6, 1938, Serial No. 228,638

3 Claims. (Cl. 84—376)

Our invention relates to supports and more particularly to a support for piano accordions or the like.

The object of our invention is to provide a means to support an accordion from the floor thereby relieving the strain on the shoulder straps of the operator.

Another object of our invention is to provide such a support that may be used by the operator in either a standing or sitting position.

A further object of our invention is to provide a device that will permit the operator to move his instrument in either direction without restrictions and without in any way affecting the support.

A still further object of our invention is to provide a device that will function in the manner described yet permitting definite longitudinal adjustment from a short or retrieved position to a height convenient to the operator without the use of a thumb screw or the like.

Other and further objects of our invention will become more apparent as the description proceeds when taken in conjunction with the drawing in which Figure 1 is a perspective illustration showing the device in an assembled position and attached to a piano accordion shown in phantom.

Figure 1:
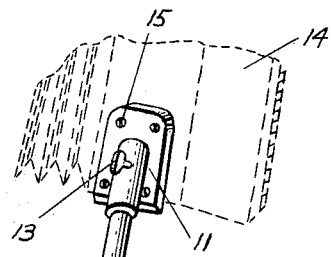
Figure 2:
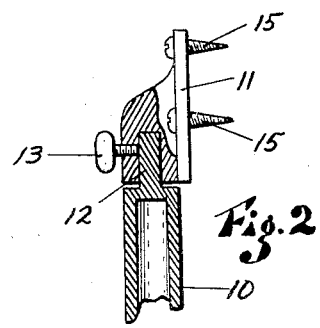
Figure 2 is a fragmentary cross-sectional view of the attaching bracket and tube.

Similar characters of reference indicate corresponding parts throughout the several views, and referring now to the same, the character 10 shows a tubular member engaging an attachment bracket 11 by means of a projecting end 12 on the tube 10 which is retained in position in the bracket 11 by means of a thumb screw 13, or in any other convenient manner. The bracket 11 is attached to an accordion 14 or the like shown in phantom by means of the screws 15 or in any suitable manner. There is a serrated rod 16 slidably engaging the tubular member 10 and retained in a fixed position by means of a lever 17 having an engaging member 18 contacting the serrations 19 of the rod 16. This lever 17 is pivotally mounted to the tube 10 at 20 and is retained in an engaging position by means of the spring 21 or in any other suitable manner. The serrated rod 16 is provided at its lower end with a ball 22 which acts as a swivel when mounted in a base 23 as shown and permits movement of the rod 16 in any direction by the operator. The base 23 is shown provided with a plurality of rubber supports 24 to prevent the entire device from slipping when it is mounted to a smooth floor or the like.

Figure 4:
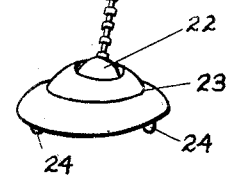
Figure 4 is a cross-sectional view of the arrangement shown in Figure 3.
Figure 4:
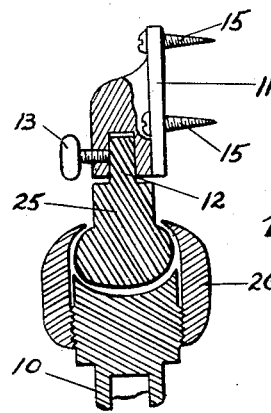
Figure 3:
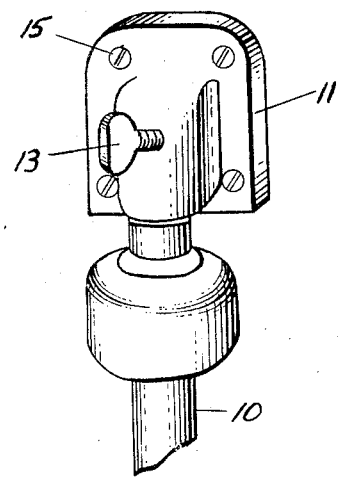
Figure 3 is a fragmentary cross-sectional view of a modified attachment bracket incorporating a swivel joint arrangement.
Figure 5:
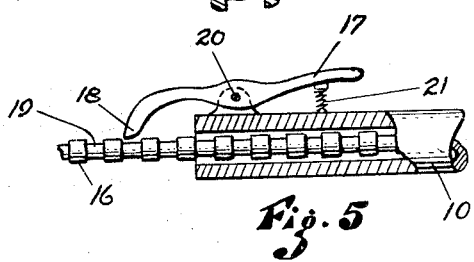
Figure 5 is a fragmentary cross-sectional view of the adjustment clamp on the tube and engaging the serrations on the support rod.

If desired the upper end of the tube 10 may be provided with a swivel or ball arrangement 25 as shown in Figures 3 and 4 and in position by means of a threaded member 26 to allow for adjustment and additional movement when fastened to the attaching bracket 11.

Obviously a device as specified and described will lend itself in a very efficient manner as a support for accordion or the like, which very often are quite heavy for a child to convey by means of the conventional straps, or even for adults when it becomes necessary to play the instruments for a greater length of time. The adjustable feature of the support permits its use in both the standing and sitting position, and when in a standing position it permits free movement in any direction to compensate for the movement of the player's body.

In the chosen embodiments of our invention exemplified by the accompanying drawing there are present new and novel features not heretofore disclosed in the prior art and although we have shown the preferred method of using same we do not wish to be limited to the specific construction and we reserve the right to make such changes and additions as fall within the scope of the appended claims.

Having thus described our invention, what we claim and desire to secure by Letters Patent in the United States is:

1. A support of the character described comprising in combination a tubular member, a serrated rod provided with a ball member at its lower end, said rod telescopically engaging said tubular member, a spring actuated clamping lever mounted to the lower end of said tubular member, said clamping lever having one end engaging the serrations on said rod the other end depending outward, a base having a socket to receive the ball on the lower end of said rod and detachable clamping means on the upper end of said tubular member, said clamping means arranged for attachment to an accordion or the like.

2. A support of the character described comprising in combination a tubular member, a rod having longitudinally spaced grooves surrounding its circumferential area, telescopically engaging said tube, a clamping means pivotally mounted on said tube, one end of said clamping means engaging said rod, the other end depending outward, a ball attached to the lower end of said rod, a base, said base supporting said ball, and a detachable clamp on the upper end of said tubular member said clamp employed for attaching to an accordion or the like.

3. A device of the character described comprising in combination a tubular member, a detachable swivel arrangement attached to the upper end of said tubular member, a serrated rod, said rod slidably engaging said tubular member, a spring actuated attaching means on said tubular member for retaining said rod and tubular member in any fixed position, a ball on the lower end of said rod, a base, said base provided with a socket to receive said ball, and attaching means on the detachable swivel for engagement with an instrument.

WALTER R. BECKER.
ARTHUR W. LORENZ.